No. 662,058. Patented Nov. 20, 1900.
G. T. CROBARGER.
CULTIVATOR COUPLING.
(Application filed Feb. 4, 1898.)
(No Model.)
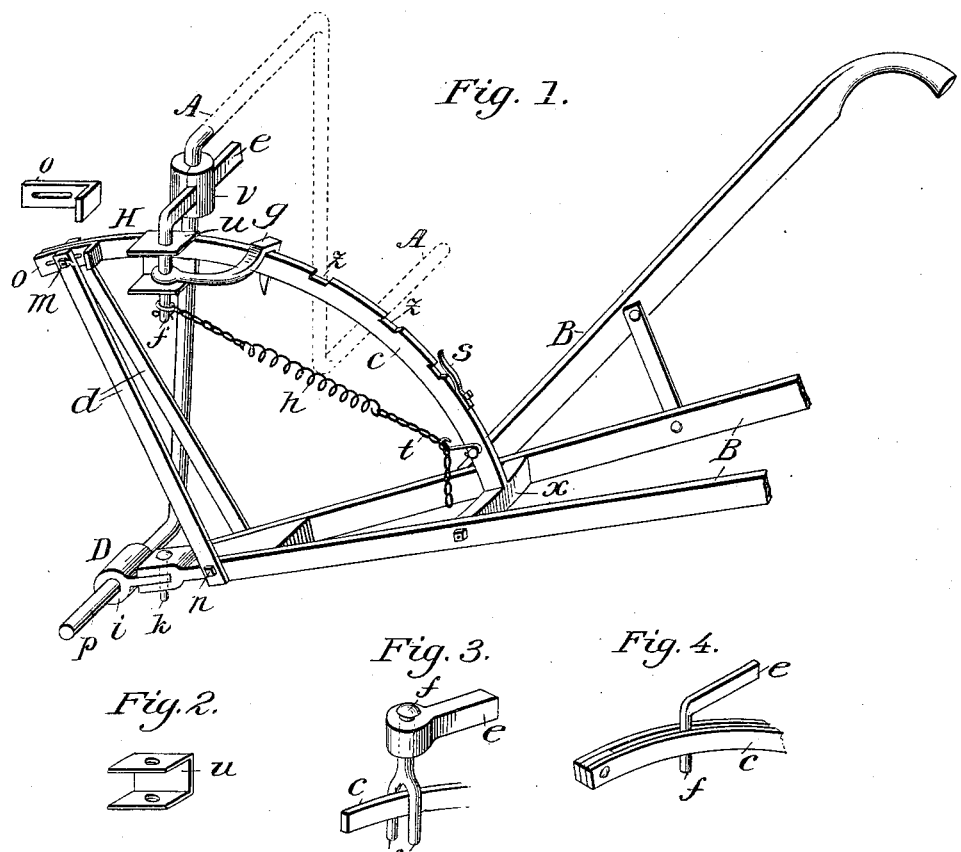

UNITED STATES PATENT OFFICE.

GEORGE T. CROBARGER, OF NEWTON, KANSAS.

CULTIVATOR-COUPLING.

SPECIFICATION forming part of Letters Patent No. 662,058, dated November 20, 1900.

Application filed February 4, 1898. Serial No. 669,108. (No model.)

*To all whom it may concern:*

Be it known that I, GEORGE T. CROBARGER, a citizen of the United States, residing at Newton, in the county of Harvey and State of Kansas, have invented a new and useful Improvement in Cultivator-Couplings, of which the following is a correct description.

My invention relates to cultivators in which the plows are hung to the main frame in gangs by means of hinges or couplings; and the objects of my improvement are, first, to increase the efficiency in a cultivator-coupling to maintain the perpendicularity of the gangs; second, to afford a better and safer means for hanging up the gangs when not in use; third, to provide an inexpensive stop to regulate the maximum depth of the plowing, and, fourth, to afford a convenient means of attaching and adjusting the cultivator-springs. I attain these objects by the mechanism illustrated in the accompanying drawings, in which—

Figure 1 is a side elevation of the invention with the gang raised slightly out of the ground. Fig. 2 is a perspective view of the swivel-plate. Fig. 3 is a plan view of a bifurcated swivel-pin hinge. Fig. 4 is a plan view of a double arc bar and pin forming a hinge. Fig. 5 is a side elevation showing the entire range of the application of the invention.

Similar letters refer to similar parts throughout the several drawings.

The dotted lines A indicate the axle-arch of an ordinary walking-cultivator, and B a cultivator-gang. The arc bar $c$ is rigidly secured between the beams at $x$, having notches $z\ z$. It passes between the jaws of the dog $g$, thence between the swivel-plate $u$ and the pin $f$, thence between the ends of the slats $d\ d$, and is rigidly secured thereto by the bolt $m$. The stay-slats $d\ d$ continue downward and are rigidly secured to the beams by the bolt $n$. There is thus formed a rigid quadrant, which in effect is a part of the gang itself, revolving back and forth around the common axis $p$ and swinging from side to side like a door on two hinges or pins $f$ and $k$.

The swivel $u$ is a thin steel plate, as shown in Fig. 2, having two holes which fit loosely around the swivel-pin $f$ and of ample width up and down to inclose both the arc bar $c$ and the pivoted end of the dog $g$. The pin $f$ extends below the swivel-plate and engages one end of the lift-spring $h$, the other end of the spring being secured and its tension regulated by the chain engaged in the hook $t$. The dog $g$ turns loosely upon the pin $f$ and rests astride the arc bar $c$. Its jaws fit loosely against both sides of the arc bar, and its head is so formed that the notches $z\ z$ are almost completely filled when the dog drops into the notch. The dog never drops into a notch until the arc bar is made to move slowly under it. The dog disengages easily when the gang is raised and will not again catch in any of the notches if the gang is suddenly lowered, for the dog readily slides up the rear incline of the notch; but gravitation acts too slowly to engage the dog again as the gang descends.

To prevent runaways or accidents in traveling to and from the field, the rear notch has over it a spring-lock $s$, which must be unlocked by the hand of the operator before the gang can be released.

In turning at the ends of the rows the operator's attention can be given wholly to his team, as he can easily raise and hang up the gangs from any position without looking, and a slight up-and-down motion of the handle or gang lowers the plows again into the ground.

At the front end of the arc-bar $c$, adjustably secured between the slats $d\ d$ by the bolt $m$, is a lug or stop $o$, which strikes against the pin $f$ when the plows have reached their maximum depth.

It is apparent that the construction in Fig. 1 shows a primary or draft hinge D below and a secondary or stay hinge H approximately above it. The two hinges being so far apart it is practically impossible to twist the gangs out of a perpendicular position in the act of plowing, while every other movement of the gang is exceptionally easy and free in all of its operations. The gang at its lower hinge is shifted sidewise in the ordinary way, and its top hinge is correspondingly shifted by means of the arm $e$ of the swivel-pin $f$, which is adjustably secured by the clutch $v$; also, the pin $f$, with its arm $e$, may be turned over, so that the pin will point up instead of down, and the arm $e$ will be below the arc-bar.

The stay-hinge H may be constructed with a bifurcated swivel-pin, as shown in Fig. 3, or the stay-hinge may be constructed with a plain pin working in the slot between a double arc bar, as in Fig. 4. The form with the swivel-plate $u$, as in Fig. 1, would be preferred for its lightness, cheapness, and simplicity. The swivel-plate $u$ may be curved at its back in order to fit against the arc bar as closely as desired.

The draft-hinge D may be either above or below the stay-hinge, as in Fig. 5, or there may be two stay-hinges with one draft-hinge between them, which are only variations in the application of the invention.

The arm $e$ and the clutch $v$ are no part of my invention, but only serve to show that the hinge-pin $f$ may be held in its position by any convenient means; also, the draft-hinge D may revolve about any convenient bar or pin provided for that purpose.

I am aware that cultivator-couplings have been used prior to my invention which operate on the principle of hanging a door on one hinge; but I am not aware that any cultivator-coupling prior to my invention employs two independent hinges, one approximately above the other and acting upon the principle of a door hung on two hinges, nor am I aware that any such coupling embodies the construction of a holdup-dog which is operated entirely and exclusively by the movement of the handle of the gang or by the gang itself as the only operative lever.

Having thus described my invention, I claim as new and desire to secure by Letters Patent—

1. A cultivator-coupling constructed of two hinges, an arc bar rigidly attached to the gang of the cultivator, and playing in an independent stay-hinge operating in conjunction with a draft-hinge substantially as described and for the purposes set forth.

2. The combination in a cultivator-coupling of a stay-hinge, a draft-hinge, and an arc bar as described, with the arc bar notched and a holdup-dog mounted on the arc bar dropping into the notches forming a holdup for the gangs substantially as described.

3. The combination in a cultivator coupling of a stay-hinge, a draft-hinge, an arc bar notched, and a holdup-dog mounted on an arc bar dropping into notches forming a holdup for the gangs as described, with a lift-spring attached at one end to the stay-hinge and at its other end to the gang, substantially as shown and described.

4. The combination in a cultivator-coupling of a stay-hinge, a draft-hinge, an arc bar notched, a holdup-dog mounted on an arc bar, and a lift-spring attached to the stay-hinge and to the gang as described with an adjustable stop or lug substantially as and for the purposes set forth.

5. The combination in a cultivator-coupling of a stay-hinge, a draft-hinge, an arc bar notched, a holdup-dog, a lift-spring attached to a stay-hinge and to the gang, and an adjustable stop or lug as described, with a lock-spring for the rear notch of the arc bar, all substantially as described and for the purposes set forth.

GEORGE T. CROBARGER.

Witnesses:
JOHN C. NICHOLSEN,
MORRIS H. CONGDON.